United States Patent
Mathew et al.

(10) Patent No.: US 11,294,877 B2
(45) Date of Patent: Apr. 5, 2022

(54) EFFICIENT FILE RENAMES USING B-TREE BASED PERSISTENCE FOR FILE SYSTEM NAME SPACES

(71) Applicant: EMC IP Holding Company LLC, Hopkinton, MA (US)

(72) Inventors: George Mathew, Belmont, CA (US); Murthy V Mamidi, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 161 days.

(21) Appl. No.: 16/518,221

(22) Filed: Jul. 22, 2019

(65) Prior Publication Data

US 2021/0026827 A1    Jan. 28, 2021

(51) Int. Cl.
*G06F 16/22* (2019.01)
*G06F 16/2455* (2019.01)
*G06F 16/174* (2019.01)

(52) U.S. Cl.
CPC ...... *G06F 16/2272* (2019.01); *G06F 16/1748* (2019.01); *G06F 16/2246* (2019.01); *G06F 16/24562* (2019.01)

(58) Field of Classification Search
CPC .................................................. G06F 16/2272
USPC ....................................................... 707/782
See application file for complete search history.

(56) References Cited

U.S. PATENT DOCUMENTS

| | | | | |
|---|---|---|---|---|
| 7,752,226 B1* | 7/2010 | Harmer | ................... | G06F 16/13 707/796 |
| 2003/0069902 A1* | 4/2003 | Narang | ............... | G06F 16/2477 |
| 2006/0112121 A1* | 5/2006 | McKenney | ......... | G06F 16/9024 |
| 2010/0049735 A1* | 2/2010 | Hsu | ...................... | G06F 16/1727 707/E17.005 |
| 2013/0339406 A1* | 12/2013 | Kanfi | .................... | G06F 16/289 707/825 |
| 2018/0189121 A1* | 7/2018 | Jobi | ...................... | G06F 9/5016 |
| 2019/0205417 A1* | 7/2019 | Lai | ........................ | G06F 16/183 |

\* cited by examiner

*Primary Examiner* — Syling Yen
(74) *Attorney, Agent, or Firm* — Staniford Tomita LLP

(57) ABSTRACT

Embodiments for optimizing file lookups after a file or directory rename operation. Files are defined using inode, dirent, and hash entries, and the name space of the files are stored in a B-Tree using file system conventions in which the inode, dirent, and hash values are referenced by the directory first followed by the inode number, as in a first data structure denoted [directory:inode]. Upon a rename of a file, the old inode, dirent, and hash entries are deleted, and a reference is created to the old name using the inode number first followed by the old directory, as in a second data structure denoted [inode:old_directory], and this reference is used as a forward link to the new file under the new directory name.

15 Claims, 9 Drawing Sheets

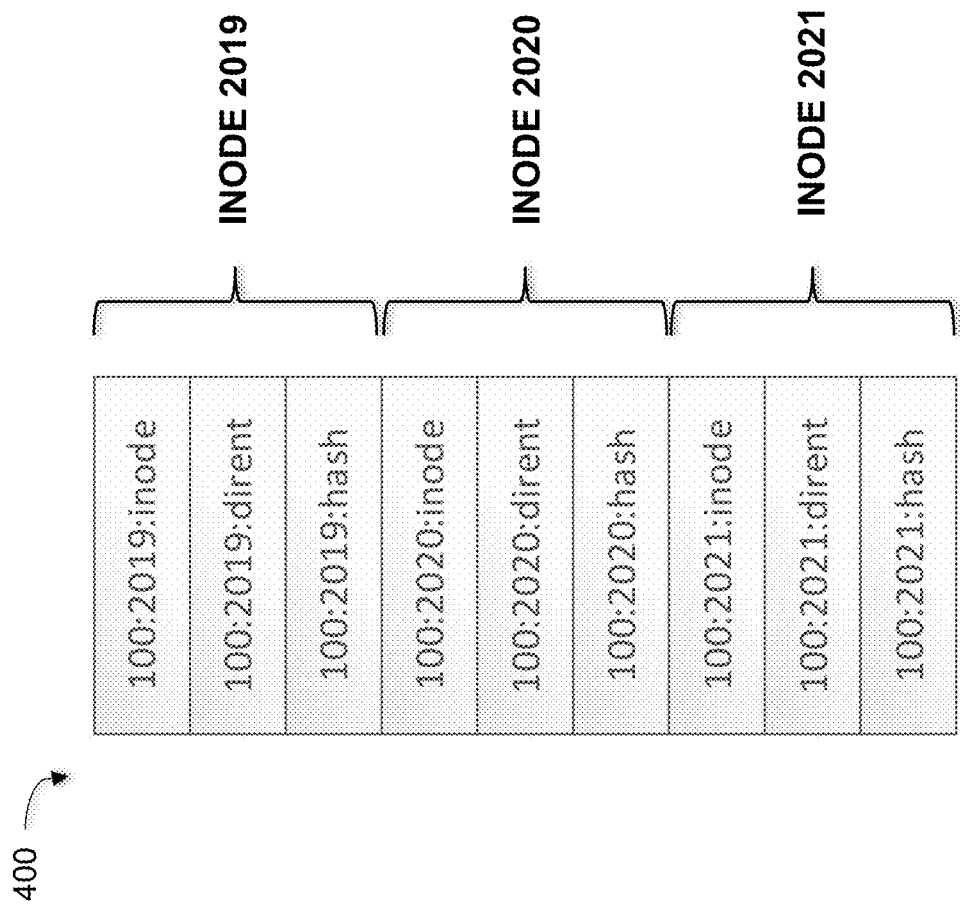

EFFICIENT FILE RENAMES USING B-TREE BASED PERSISTENCE FOR FILE SYSTEM NAME SPACES

TECHNICAL FIELD

Embodiments are generally directed to network storage systems, and specifically to optimizing file lookups after a file or directory rename operation.

BACKGROUND

All file systems provide directory and file abstraction among other features. To support such a naming scheme, file systems must store at least a block map to hold the name of a file, its content, and some mechanism (e.g., hashing) to do quick name comparisons for file lookups. File systems incorporate these three basic tenets in a set of three abstractions or records, namely, inode, dirent and name hash. File systems also support directory listing protocol commands that traverse the name space. This operation is very frequent and must thus be very fast, so file systems must use an efficient way to store and retrieve the name space information with low latencies.

In some file systems, a binary tree (B-tree) is used to store the namespace of the file system in persistent storage. In general, a B-tree is a self-balancing tree data structure that maintains sorted data and allows searches, sequential access, insertions, and deletions in logarithmic time. B-Trees are well suited for storage systems that read and write large blocks of data and are used in filesystems to allow quick random access to an arbitrary block in a particular file. In a B-tree, a search starts from the root and recursively traverses down. For every visited non-leaf node, if the node has the key (k), it simply returns the node. Otherwise, it recurs down to the appropriate child of the node. If it reaches a leaf node and does not find k in the leaf node, it returns a NULL value. A traversal operation starts from the leftmost child, and recursively prints the leftmost child, then repeats the same process for the remaining children and keys until it ultimately recursively prints the rightmost child.

An inode (index node) is a file system data structure that describes an object, such as a file or directory. Each inode stores the attributes and disk block locations of the object's data. File-system object attributes may include metadata that encodes information such as time of last change, access, modification, owner, permission data, and so on. Directories are lists of names assigned to inodes. A directory contains an entry for itself, its parent, and each of its children.

In systems using B-Trees, it is necessary to co-locate all the files of a given directory in the same region in the persistent store to support efficient directory listing retrievals. By doing so, the file system will be able to retrieve the directory listing of files in a directory by reading as little portion of the storage as possible, while returning the maximum amount of file system name space with fastest possible time. One mechanism is to use a B-Tree key structure composed of the parent directory inode as the primary key and child file inode as the secondary key to construct the full key. By virtue of B-Tree key properties, all the child file inodes are stored in a cluster in a given storage region, thus allowing the file system to retrieve the directory listing of files in a directory by reading as small a storage portion as possible, while returning the maximum amount of file system name space with fastest possible time.

Each file inode is thus stored in the B-Tree as a data blob using the parent directory inode number and the child file inode number as the key. Such a data structure may be denoted: "<parent_inode:child_inode>". This key is used to create a file handle that is exposed to client devices. For data integrity, it is important that file handles remain immutable so that files can always be located during their lifetimes. It is not uncommon, however, for files and directories to be renamed at least once, if not multiple times during their existence. File handles must thus be updated to track the location of files that are renamed. Current methods of handling file renames are generally optimized for file lookups using file handles created prior to a rename, but create complications for file operations after the rename. For example, staging directories, or other similar temporary data structures must keep all of the inode numbers ever created to provide the necessary backlinks for updated file handles. This creates a high degree of file lookup inefficiency and storage overhead for systems in which multitudes of file names are regularly or constantly renamed.

What is needed, therefore, is a system and method for handling renames that optimizes lookups after a file rename, even at the expense of slightly complicating lookups before the rename, especially in systems where file and/or directory renames are a usual occurrence.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Dell, EMC, Networker, Data Domain, and Data Domain Boost are trademarks of Dell/EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 4 illustrates the records for three example inodes, under an example embodiment.

DETAILED DESCRIPTION

Figure 1:
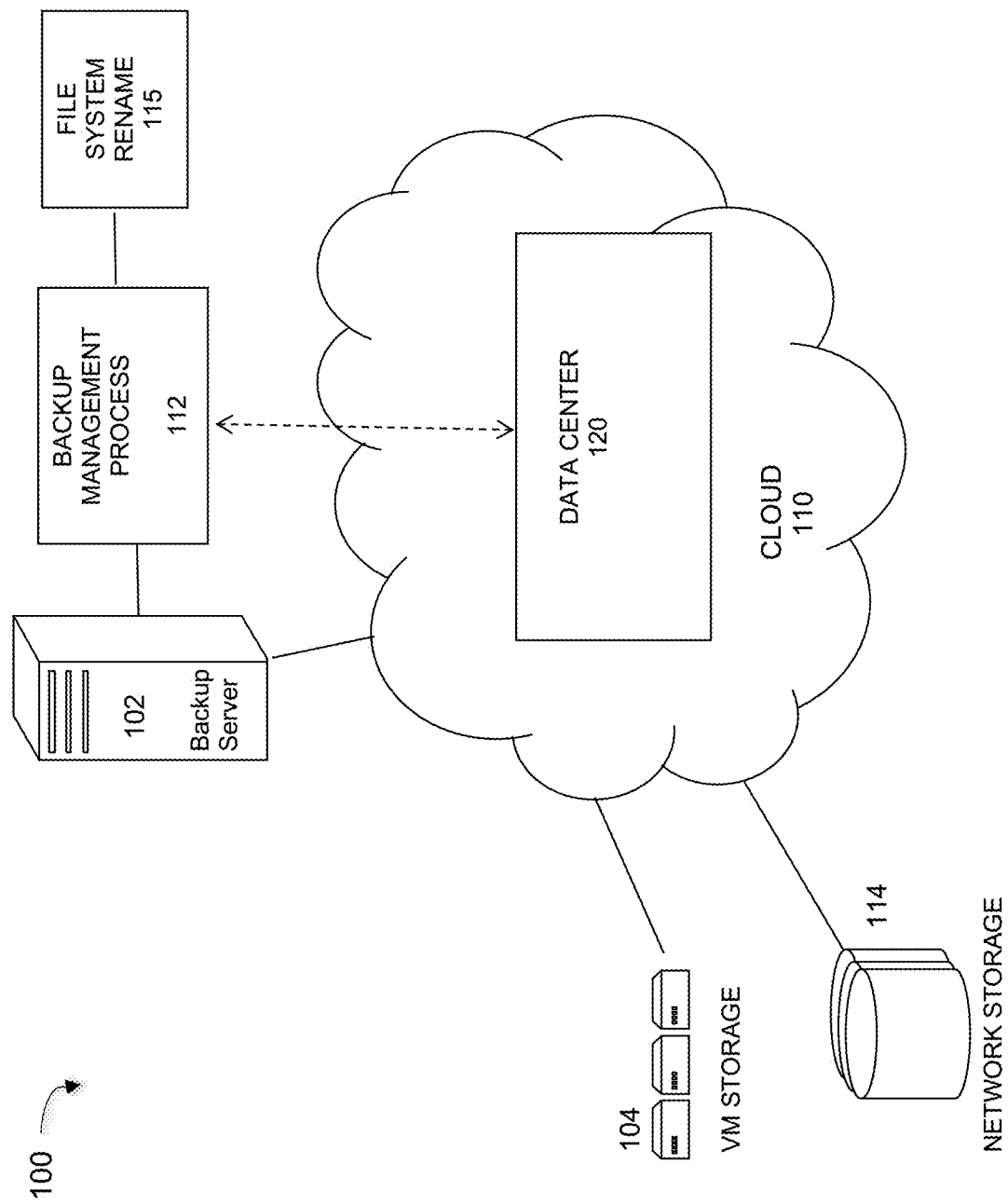
FIG. 1 illustrates a computer network that implements a file rename process using B-Tree based persistence, under some embodiments.

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. In this specification, these implementations, or any other form that the invention may take, may be referred to as techniques. In general, the order of the steps of disclosed processes may be altered within the scope of the described embodiments.

FIG. 1 illustrates a computer network system implements embodiments of a file rename process using B-Tree based persistence. System 100 comprises a large-scale network that includes a number of different devices, such as server or client computers 102, data center 120, storage devices 114, and other similar devices or computing resources. Other networks, sub-networks, and components may be included in system 100 including local area network (LAN) or cloud networks 110 and virtual machine (VM) storage 104 or VM clusters. These devices and network resources may be connected to a central network, such as a central or cloud computing network 110 that itself contains a number of different computing resources (e.g., computers, interface devices, and so on). FIG. 1 is intended to be an example of a representative system implementing a data storage and processing under some embodiments, and many other topographies and combinations of network elements are also possible.

For the example network environment 100 of FIG. 1, server 102 is a backup server that executes a backup management process 112 that coordinates or manages the backup of data from one or more data sources, such as other servers/clients to storage devices, such as network storage 114 and/or virtual storage devices 104, or other data centers. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, which may have attached local storage or utilize networked accessed storage devices 114. Backup targets or appliances may also be included in a data center 120 hosted in its own network (e.g., cloud) 110. Data center 120 may represent the computing resources running the information technology (IT) system of an organization or enterprise, and which are organized an interconnected in their own network, such as cloud 110. Typical data centers are relatively large-scale facilities that may be distributed around the world, but embodiments are not so limited. Any appropriate scale of intra- and inter-networked computers may be used, such as data centers within a state or region, municipality, or organization (e.g., corporation, school, University, hospital, etc.).

The network or networks of system 100 generally provide connectivity to the various systems, components, and may be implemented using protocols such as Transmission Control Protocol (TCP) and/or Internet Protocol (IP), well known in the relevant arts. In a cloud computing environment, the applications, servers and data are maintained and provided through a centralized cloud computing platform. In an embodiment, parts of system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client or server storage. The storage devices represent protection storage devices that serve to protect the system data through the backup process 112. Thus, backup process 112 causes or facilitates the backup of this data to the storage devices of the network, such as network storage 114, which may at least be partially implemented through storage device arrays, such as RAID (redundant array of independent disks) components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. The data sourced by the data source may be any appropriate data, such as database data that is part of a database management system within a data center comprising a server or servers and other clients, and the data may reside on one or more hard drives (e.g., 114) for the database(s) in a variety of formats. The backup server 102 may be a server running Networker or Avamar data protection software backing up to Data Domain protection storage, such as provided by Dell/EMC™ Corporation. However, other similar backup and storage systems are also possible.

As stated above, for the embodiment of system 100, network server 102 is a backup server that executes a deduplication backup process. The deduplication backup process may also be run partially or wholly within a VM, instead or as well. Network server 102 may also be a server computer that supports part or all of the hypervisor functions. In an embodiment, the virtual machines that use or are used as part of the deduplication backup process are implemented as part of a Data Domain (DD) system, though embodiments are not so limited. Data Domain systems present a single filesystem across all storage to enable ease-of-use and simple management. This single filesystem can be completely or partially exposed as CIFS shares (for Windows), NFS mount points (for Unix/Linux), VTL for open systems and IBMi and/or through advanced integration with Data Domain Boost (for Dell/EMC Avamar, Dell/EMC Networker, Dell/EMC Greenplum, Veritas NetBackup, Veritas Backup Exec, Oracle RMAN and Quest vRanger, and other similar programs).

In a deduplication backup system utilizing virtual machines (VMs), each VM runs its own file system, such as a Data Domain Restorer (DDR) or Data Domain File System (DDFS) by Dell/EMC Corp., along with other possible applications. In the DDFS (or similar) file system, protocol-specific namespaces are presented to clients/applications for accessing the logical file system layer. Some example protocol namespaces include: Data Domain Virtual Tape Library, Data Domain Boost storage units, and CIFS/NFS fileshares.

In an embodiment, files and directories for each namespace in system 100 are stored in a B-Tree, or other similar self-balancing tree structure. Associated with the backup management process 112 is a file system rename process or component 115, which effectively optimizes file lookups for file handles after file or directory rename operations. Although embodiments are described with reference to B-Trees, embodiments are not so limited, and other similar data structures to B-Trees may be used, such as B+-Trees, Mtrees, and the like. A B+Tree is a variant of a B-Tree in which copies of keys are stored in the internal node, the keys and records are stored in leaves, and a leaf node may include a pointer to the next leaf to speed sequential access.

For the example embodiment of FIG. 1, the data storage system is a Data Domain system. In the Data Domain Operating System filesystem, protocol-specific namespaces are presented to clients/applications for accessing the logical filesystem layer. The files and directories in each B-Tree all reference the same pool of unique segments, called a collection, which is made up of log-structured containers that organize the segments on disk to optimize throughput and deduplication effectiveness. Within a Data Domain system, there are several levels of logical data abstraction above the physical disk storage.

Figure 2:
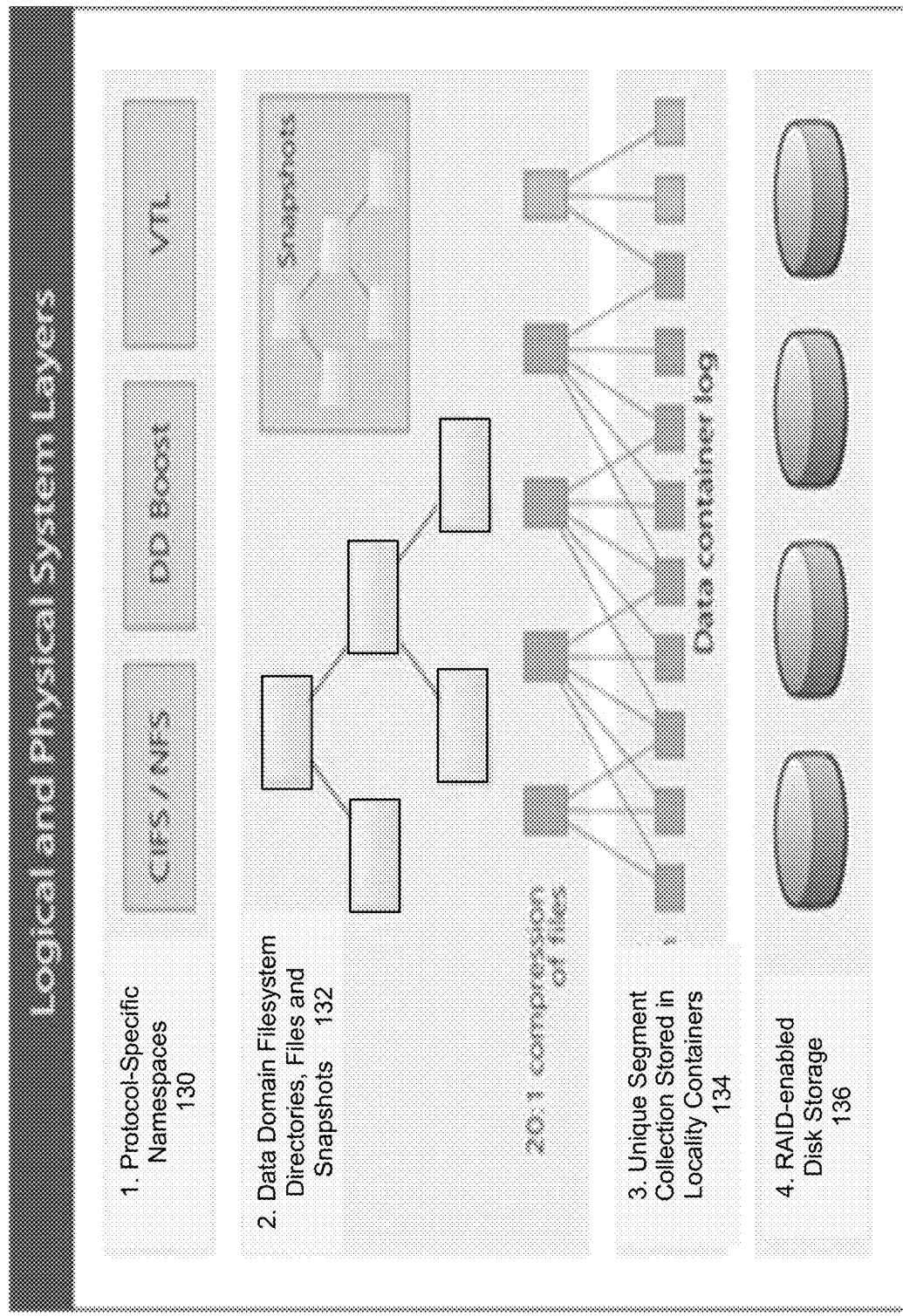
FIG. 2 levels of data abstraction in a Data Domain system including Mtrees that implement a file rename process using B-Tree based persistence, under some embodiments.

FIG. 2 illustrates levels of data abstraction in a Data Domain system including tree-based data structures that implement an optimized file rename method, under some embodiments. As shown in FIG. 2, the Data Domain Operating System (DDOS) filesystem comprises protocol-specific namespaces 130 that provide an external interface to applications, such as CIFS/NFS file shares (over Ethernet), virtual tape libraries (VTL) (over Fibre Channel) and DD Boost storage units (SUs). A Data Domain deployment may use any combination of these simultaneously to store and access data. The filesystem B-Trees, directories, files and snapshots layer 132 contain the files and directories for each namespace that are stored in an B-Trees in the DDOS filesystem. The snapshots in DDOS are logical and very space-efficient because they share the same underlying data segments. A unique segment collection 134 is stored in locality containers. The system identifies and eliminates duplicate segments within each container and then writes compressed deduplicated segments to physical disk. The RAID-enabled disk storage layer 136 comprises a collection containers layer over RAID enabled disk drive blocks to ensure data security and integrity.

Figure 3:
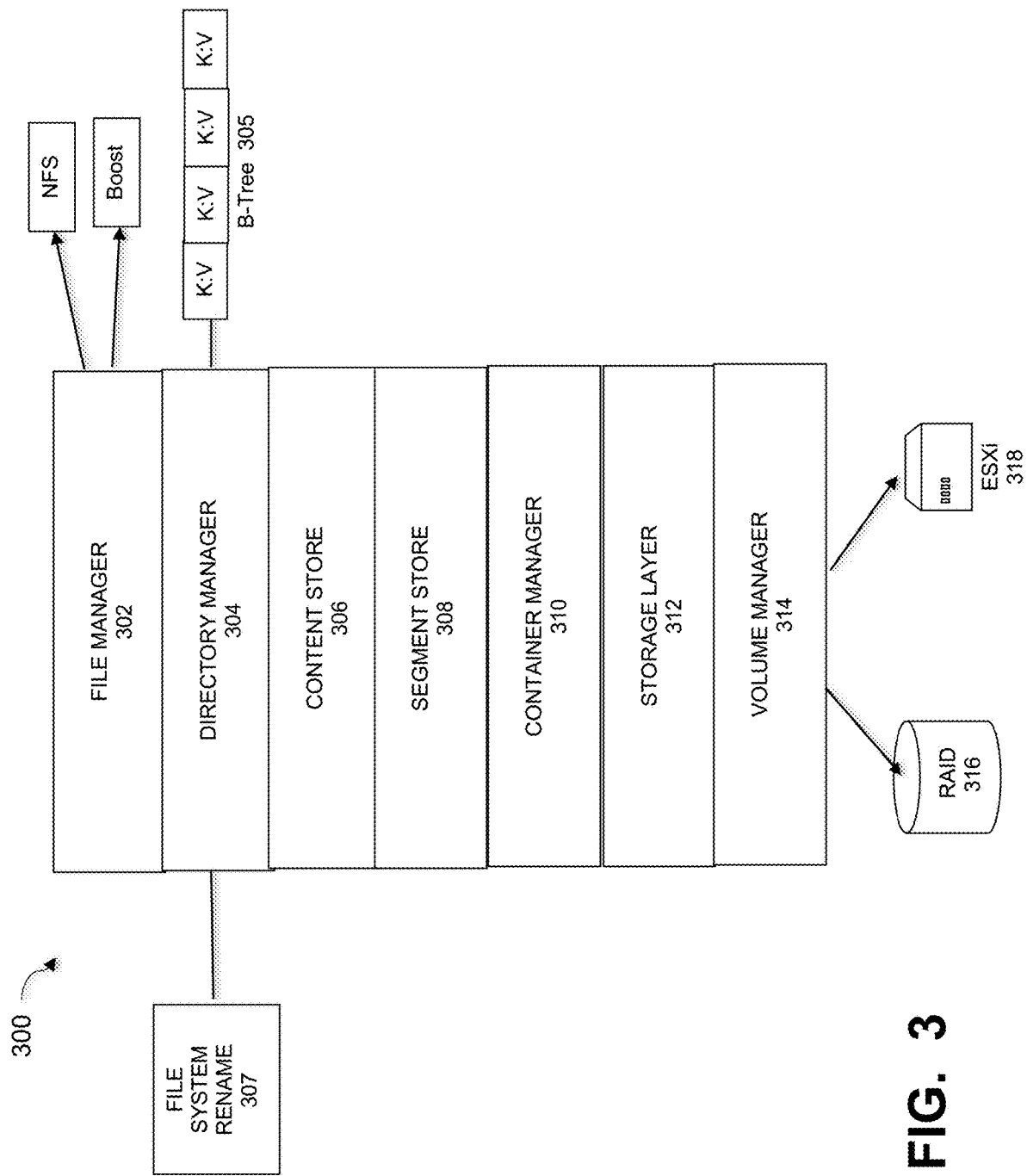
FIG. 3 illustrates a file system architecture that implements embodiments of a file rename process using B-Tree based persistence.

FIG. 3 is a diagram of functional layers for a file system that implements embodiments of a file rename process. As shown in FIG. 3, the top layer of architecture 300 is a file manager (FM) 302, which interfaces with the file system (e.g., NFS) and other file systems, such as Boost, etc. The next layer is the directory manager (DM) layer 304. This layer includes the namespace stored in the tree structures 305 as key-value pairs. In an embodiment, the file system rename process 307 works in conjunction with the directory manager to manage the key-value pairs within the B-Tree to optimize for lookups after file renames, as described in greater detail below. The remaining layers of the file system architecture 300 include a content store (CS) 306, a segment store 308, a container manager (CM) 310, a storage layer 312 and a volume manager 314. The volume manager provides an interface to the actual storage devices, such as RAID devices 316 or VMs 318 controlled through a hypervisor, such as ESXi, and the like. FIG. 3 illustrates one example of a storage system architecture that can work with embodiments of file system rename process 307, and other similar layer-based architectures are also possible.

File Rename Process

Present systems, as described in the Background section, are optimized for file lookups using file handles created prior to a rename but thus complicate file operations after the rename. The file system rename process 307 changes this priority to optimize lookups after a rename, at a slight expense of pre-rename lookups.

For purposes of this description the term "file" is given its usual meaning and refers to a collection of data stored in one unit and identified by a unique file name. Such a file can be any type of data, such as a document, image, audio file, video file, data library, application, or other collection of data. A file is usually stored in a single unique location of storage media to facilitate data integrity and efficient retrieval.

In general, a file rename refers to any operation that changes the file handle of a single file. Such a rename may be a change in the name of the file itself or a directory holding file. Either will change the full path for the file. For instance if directory is changed, an example path would change from: "/old_dir/same_file_name" to "/new_dir/same_file_name." If the name of the file changes, but the directory or directories stay the same, the path would change from: "/some_dir/old_file_name" to "/some_dir/new_file_name." Thus, any change in file name or directory will cause the user will to see the difference in the directory listing. For computer (i.e., non-human) clients that use a file handle rather than a name, the effect of a file rename versus directory rename is the same because the file system (e.g., DDFS) is required to maintain the same behavior. Similar changes may be caused by a change in the volume storing the directory in the file, or any other change that results in a change in storage location or storage index of the file. Generally, an update or modification that does not change the files actual or referenced location does not constitute a file rename.

In general, to optimize a file system directory read operation (e.g., NFS readdir_plus( ) functionality), file systems store the name space information with the parent directory inode as the primary key and child inode number as the secondary key. This ensures that all the files belonging to the same directory will be co-located in the B-tree and a direct read operation will have to read few pages (e.g., WAFL, DDFS, etc.). The parent inode number and the child inode number are also used to create the file handle exported to the clients. For protocols like NFS (network file system), a file handle obtained once should remain valid until the file is removed. Even though this <parent_inode:child_inode> key based organization optimizes the readdir_plus( ) functionality, it creates a problem for the rename of a file across directories. Since the rename can potentially change the parent directory inode and since the file handle exported before the rename must still work after the rename, the B-Tree entry for the file inode is kept with the old directory inode, but a new link is created from the new directory to the old directory. As stated above, this problem exists in some present B-tree based file systems, and the current <parent_inode:child_inode> organization optimizes the references of a file for file handles exported before the rename operation, but penalizes the lookups done after the rename. Similarly, for use cases like a staging directory, where the files are ingested on a temporary directory first and then renamed out later, all inodes will be stored with the staging directory inode as a primary key. A directory read in the staging directory will be extremely expensive in this case.

Embodiments are directed to file systems that store the block map to store files using a set of three abstractions or records including the inode ID, dirent and name hash. The dirent (directory entry) is a structure type used to return information (e.g., names) about directory entries. The name hash is a hash value that facilitates lookup comparisons. Thus, in an embodiment, a file is distinctly identified by the following structure: [inode, dirent, hash], where the entry of the structure is referenced by the directory:file index for the inode. Other entries are also possible, such as file attributes, parameters specific to the inode, and other information specific to the file system. Thus, a fuller file system reference may comprise [inode, dirent, hash, attributes, FS information, etc.]. For purposes of description however, embodiments are described in relation to inode, dirent, and hash only.

FIG. 4 illustrates example records for a number of inodes, under an embodiment. Diagram 400 shows three files with inodes 2019, 2020, 2021 and their respective hashes and dirents. All of these three inodes are under the same parent directory denoted "100" and thus all the files are collocated closely to the parent directory. As mentioned earlier dirents store the name of the file and hashes will facilitate quick name comparisons. Because of the above key structure, the files of a given directory will be clustered together in a given storage region for quick retrieval and efficient storage. However, once files are renamed, which may be very frequent, particularly when the parent directory gets changed, the locality of name space is affected dramatically.

To facilitate quick file searches, a file when renamed to be placed in a different directory will have its components placed in a new parent directory. Most file systems use some scheme to encapsulate directory and file inode numbers into the file handle in a secure way but keep it as opaque as possible. However, to keep the immutability of the file handle, the original inode must be preserved. In present known systems, this is accomplished by forming a backlink from the new location to the old location of the inode.

Figure 5A:
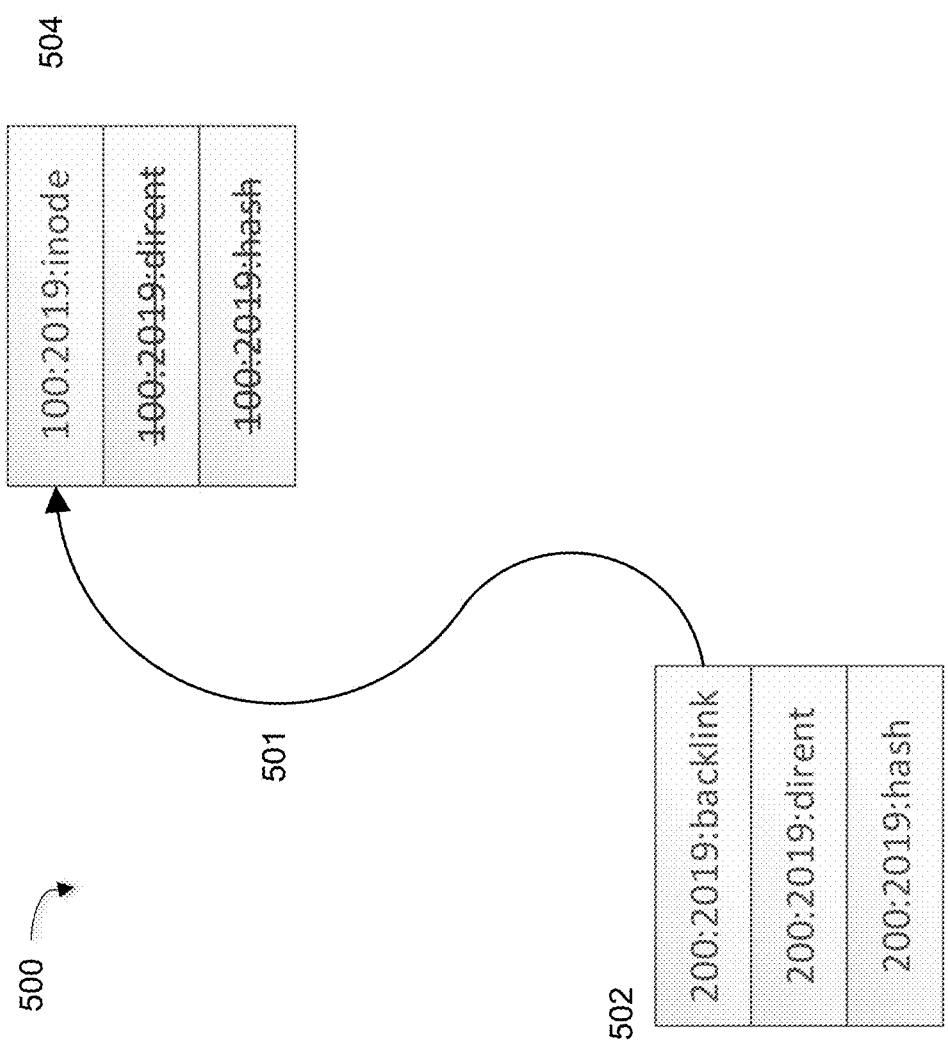
FIG. 5A illustrates a present backlink data structure that is altered using file rename process, under an example embodiment.

FIG. 5A illustrates a present backlink data structure, and that is altered using file rename process, under some embodiments. As shown in diagram 500, inode 2019 under the directory inode 100 is renamed to directory with inode 200. Since these two directories have different inodes, it is natural that their content will cluster in totally different storage regions. To retain the efficiency of directory listing, the file system would have to move the dirent and hash of inode 2019 to its new parent directory of inode 200 and delete the same from under that of its old parent 100. However, it would not be able to do the same with the old location of inode record itself, because most file systems use some scheme on the inode record to represent the file handle. To maintain the immutability of the file handle, a backlink 501 is provided back to the original inode reference 504 for the file under the old parent directory 100.

As stated previously, this reliance on parent directory inode in the file handle is problematic for renamed files. The first problem is sparseness of the original parent directory as depicted above with all the deleted dirent and hash records of the files renamed. This leads to inefficient use of space and necessity for compaction. The second problem affects the latency of the file searches. For example, when a name-based lookup comes for files that were not renamed but stayed back where they were, for instance under the directory with inode 100, such lookup will end up needing to parse through many deleted hashes and dirents before it can start doing real work. When applications use such directories for staging routinely, there will be huge number of such deleted entries and lookup latencies can increase dramatically.

A third issue with this scheme is the need for immutability of the file handle. In the example diagram 500, a file handle of inode 2019 that was exported to external clients when it was under the directory corresponding to inode 100 will still need to represent the file that is now under the directory corresponding to inode 200. So, if a name based look up comes up for the renamed file under the new directory, the backlink 501 must be followed to trace to the old location of the inode that was in a different storage region. However, over a period of time as the new location becomes more established, it would be beneficial if file systems could avoid this backlink following method.

Such issues are solved by modifying the backlink entry in systems that do not reuse an inode even after the file with that inode is deleted. In this case, the inode is a monotonically increasing number. This design tenet can be exploited to maintain both the immutability of the file handle as well as fast lookups.

Figure 5B:
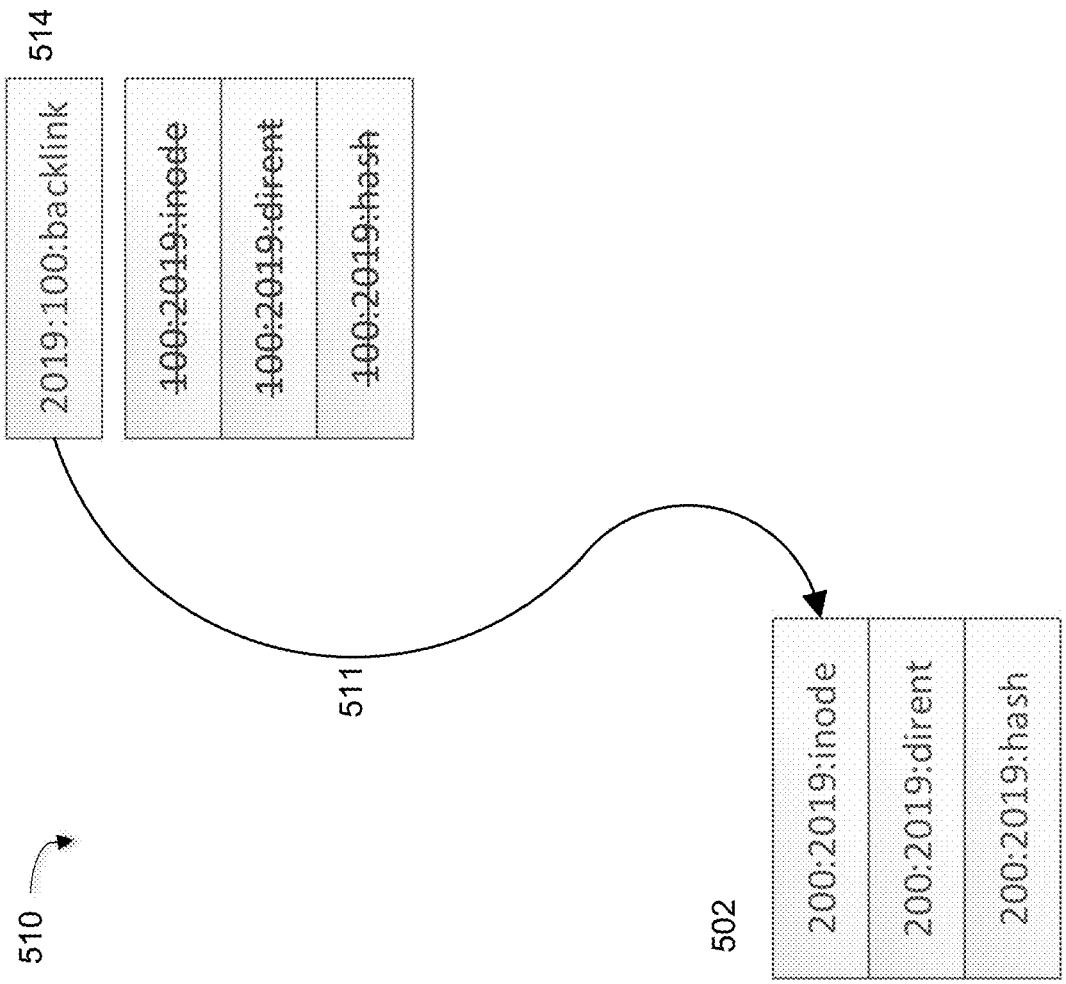
FIG. 5B illustrates a modified backlink used in a file rename process, under an example embodiment.

FIG. 5B illustrates a modified backlink used in a file rename process, under some embodiments. As shown in diagram 510, the dirent and hash of file corresponding to inode 2019 gets moved to the directory corresponding to a new directory with inode 200 (as in FIG. 5A), and they are also removed from that of the old directory. Under the new process, the inode record that usually represents the file handle of the file is also removed from its old location and moved to a new location. The backlink, in this case, is constructed by interchanging the file inode and old directory inode. Thus, the backlink record is changed from <parent_inode:child_inode> to <child_inode:parent_inode>, or from <directory:file> to <file:directory>. Thus, for the example of FIG. 5B, the backlink 511 reference is 2019:100:backlink, and the old 100:2019:inode entry is deleted along with the old dirent and hash entries.

Since it is guaranteed that inodes are never reused, this mechanism ensures that there will be no directory with inode 2019 because it was already allocated to a file, and hence there will not be any key collisions. Since the directory contents of the new directory corresponding to inode 200 are collocated, the name lookups based off of the new directory (2019) will be fast. Any lookup based of the file handle based off of the old directory (100:2019) will first fail. Once it fails, file system can swap the inodes and lookup 2019:100 to follow the backlink 511 to the new location. Essentially, link 511 functions as a forward link from the renamed reference 514, rather than a true backlink to an original reference (such as in FIG. 5A). File lookups based on exported file handles prior to rename may thus incur a penalty to follow the new link, but their immutability is preserved. As the new location becomes the norm, newly exported file handles can directly look up the file in the current location. With respect to this process, the file handle that was translated from the old file name and/or old directory location prior to rename is usually cached by the clients for an indefinite time. As long as a client keeps such a handle in its cache, it tends not to do a name based lookup to get the handle because they it already has the handle in hand; but if the client loses its cache (e.g., due to any cache purging and/or client crashes), it must start over again with a name and get the handle. Usually clients keep track of file paths in their backup catalogs. So when they lose their cache and need to get the handle, they will have the latest name and directory location of the file and use that path to get the handle again, thus mitigating this penalty over time.

It should be noted that all the records belonging to the renamed files are completely removed from their old location, as shown in FIG. 5B. Thus, the directory space of directory corresponding to inode 100 can now be more tightly compacted. Secondly the file name searches under the directory corresponding to inode 100 would not need to parse through any deleted entry clutter. Old file handles remain immutable, and new file handles suffer no latency penalty involved with backlinks.

Figure 6:
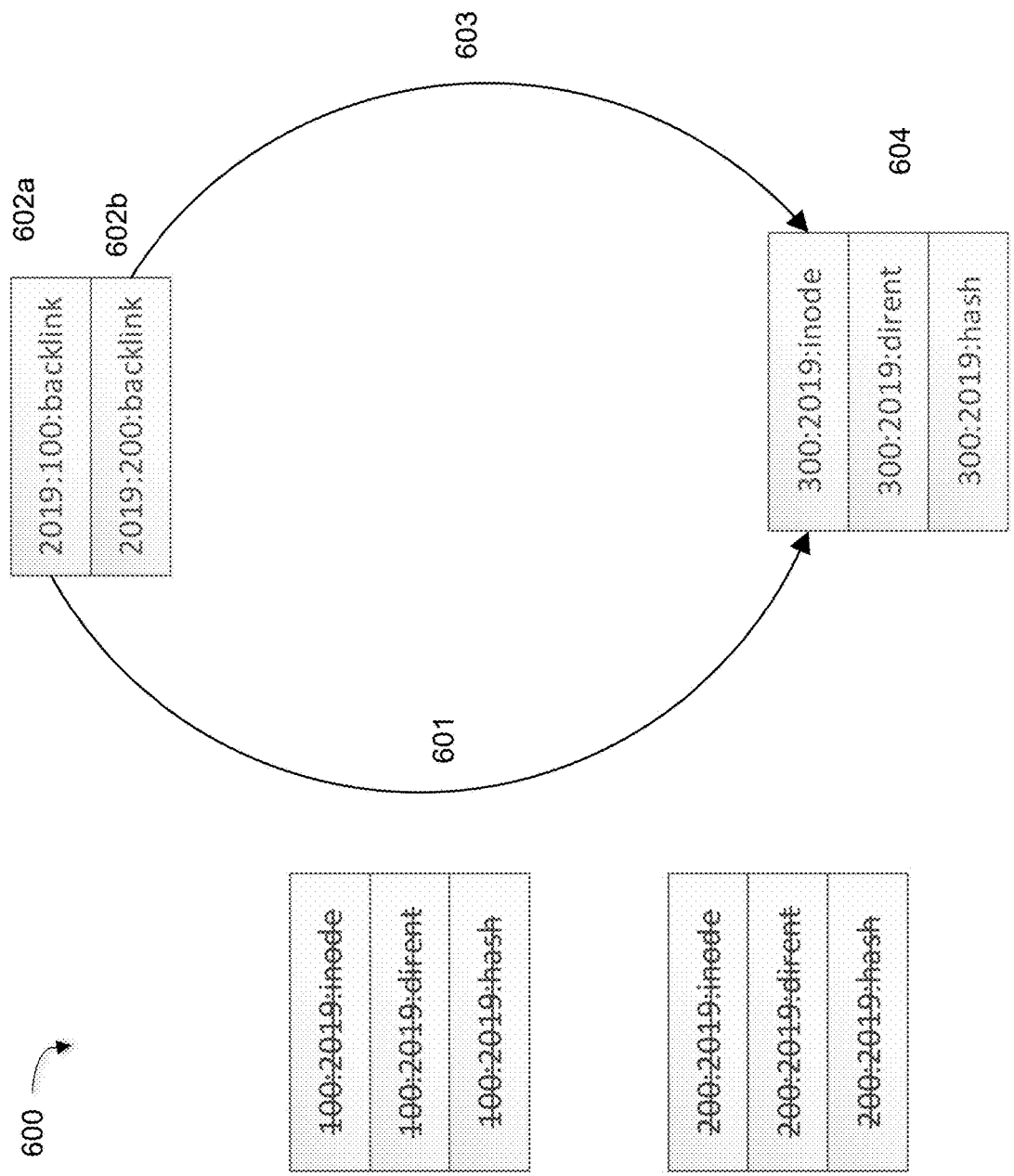
FIG. 6 illustrates the operation of the file rename process for multiple file renames, under an example embodiment.

The file rename mechanism of FIG. 5B can also be used iteratively for multiple renames of a given file. FIG. 6 illustrates the operation of the file rename process for multiple file renames, under some embodiments. As shown in diagram 600 of FIG. 6, the file under directory 100 is first renamed to exist under directly 200 and then renamed again to exist under directory 300. All the inode, dirent, and hash entries under directories 100 and 200 are entirely deleted in favor of the entries 604 under directory 300. Corresponding backlink references 602a and 602b are created for each of the respective directories 100 and 200, with the format: <file:directory:backlink>. The old directory 100 backlink 602a references the new directory 300 inode through link 601 and the old directory 200 backlink 602b references the new directory 300 inode through link 603. The entries 602a and 602b create a single unitary pseudo-directory for file over its history, such that when the file is ultimately removed, the file references can be enumerated and efficiently removed, since all the backlinks will be co-located in that pseudo directory starting with entry 2019.

Although embodiments are described in relation to file systems that do not reuse inode numbers for deleted files, embodiments can also be used for systems that reuse the inodes of deleted files to create new files. In this case, a combination of inode number and an integer number generator can be used to generate unique new inode numbers.

Figure 7:
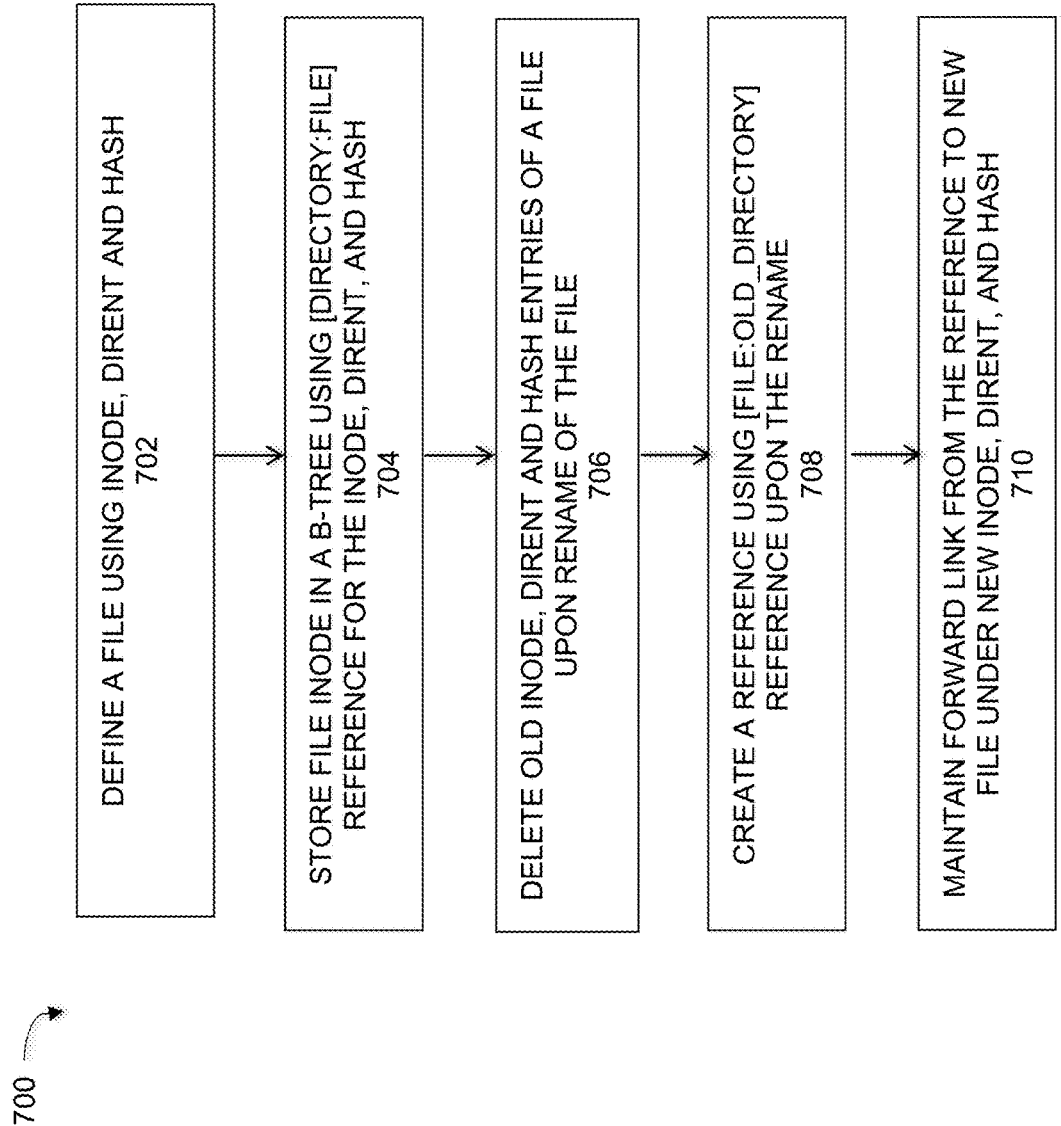
FIG. 7 is a flowchart that illustrates a method of a file rename process using B-Tree based persistence, under some embodiments.

FIG. 7 is a flowchart that illustrates a method of a file rename process using B-Tree based persistence, under some embodiments. The process 700 of FIG. 7 starts by defining files using inode, dirent, and hash entries, along with any other data that might be relevant (e.g., attributes, etc.). The name space of the files are stored in a B-Tree using standard file system conventions in which the inode, dirent, and hash values are referenced by the directory first followed by the inode number, e.g., [directory:inode], step 704. Upon a rename of a file, its old inode, dirent, and hash entries under the old name are deleted, step 706. A reference to the old file name is created using the inode number first followed by the old directory, thus: [inode:old_directory], step 708. This reference is used as a forward link to the new file under the new directory name, step 710.

The process of FIG. 7 generally applies only to cases in which the directory location changes, irrespective of whether the file name also changes or not.

Embodiments have been described in the context of a file referenced by a [directory:file] or [directory:inode] data structure. However, embodiments are applicable to any file that is organized in a tree-based organization in any [parent:node] structure. In this case, the new reference is formed by swapping the entries to [node:parent] and storing this swapped structure as the reference for a forward link to the new location of the file.

System Implementation

Figure 8:
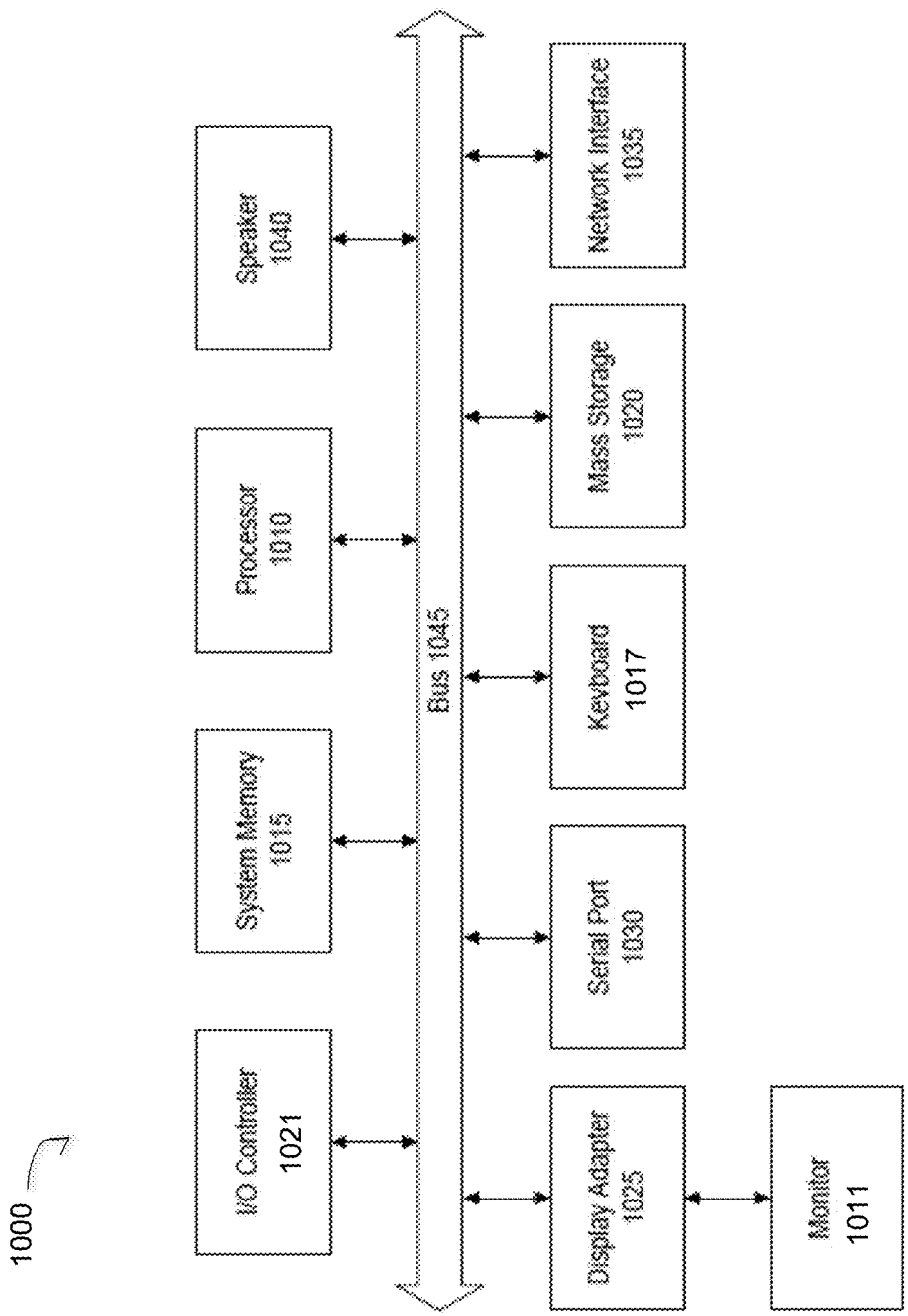
FIG. 8 is a block diagram of a computer system used to execute one or more software components of a file rename process using B-Tree based persistence, under some embodiments.

FIG. 8 is a block diagram of a computer system used to execute one or more software components of a file rename process using B-Tree based persistence, under some embodiments. The computer system 1000 includes a monitor 1011, keyboard 1017, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 8 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac™ OS X, IRIX32, or IRIX64. Other operating systems may be used.

Although certain embodiments have been described and illustrated with respect to certain example network topographies and node names and configurations, it should be understood that embodiments are not so limited, and any practical network topography is possible, and node names and configurations may be used.

Embodiments may be applied to data, storage, industrial networks, and the like, in any scale of physical, virtual or hybrid physical/virtual network, such as a very large-scale wide area network (WAN), metropolitan area network (MAN), or cloud-based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network. The network may comprise any number of server and client computers and storage devices, along with virtual data centers (vCenters) including multiple virtual machines. The network provides connectivity to the various systems, components, and resources, and may be implemented using protocols such as Transmission Control Protocol (TCP) and/or Internet Protocol (IP), well known in the relevant arts. In a distributed network environment, the network may represent a cloud-based network environment in which applications, servers and data are maintained and provided through a centralized cloud-computing platform.

Some embodiments of the invention involve data processing, database management, and/or automated backup/recovery techniques using one or more applications in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Although embodiments are described and illustrated with respect to certain example implementations, platforms, and applications, it should be noted that embodiments are not so limited, and any appropriate network supporting or executing any application may utilize aspects of the backup management process described herein. Furthermore, network environment 100 may be of any practical scale depending on the number of devices, components, interfaces, etc. as represented by the server/clients and other elements of the network. For example, network environment 100 may include various different resources such as WAN/LAN networks and cloud networks 102 are coupled to other resources through a central network 110.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of optimizing file searches after file renaming in a data storage system having a file system comprising multiple functional layers of a computer processing architecture, comprising:

defining, in a directory manager layer of the file system, a first location of a file through a file handle including a dirent and hash of the file in a first data structure: <parent_inode:child_node>;

moving the file from a first location to a second location in a file rename operation to create a new file handle specifying a new parent inode and child inode for the dirent and hash of the file;

removing an inode record of the file handle from the first location from movement to the second location, wherein the inode record is a monotonically increasing number and further wherein an inode for the second location is higher than an inode for the first location;

creating, in the directory manager layer, a reference to the first location through a second data structure that reverses an order of the first data structure to: <child_inode:parent_inode> and serves as a forward link to the second location of the renamed file to maintain immutability of the file handle after the file renaming by pointing to an original inode reference for the file under an old parent directory of the first location;

deleting all dirent, hash, and inode data of the file from the first location;

using the second data structure to reference the file in the second location; and processing a lookup request for the renamed file by using the second data structure to locate data for the renamed file in the data storage system.

2. The method of claim 1 wherein the file rename operations changes the parent_inode from a first inode value to a second inode value.

3. The method of claim 1 wherein a parent_inode identifies a directory storing the file, and a child_inode identifies a file identifier of the file within the directory.

4. The method of claim 1 wherein the dirent comprises a directory entry storing the name of a corresponding file, and the hash comprises a hash value of the name to facilitate fast name comparisons during a search operation.

5. The method of claim 1 wherein a name space including the file is stored as a B-Tree in a file system.

6. The method of claim 5 wherein the file system comprises a Data Domain deduplication storage system.

7. The method of claim 5 wherein the file system does not reuse an inode number after a corresponding file has been deleted.

8. The method of claim 5 wherein the file system reuses an inode number after a corresponding file has been deleted, the method further comprising generating a unique integer associated with a reused inode number to reference the new file.

9. The method of claim 5 wherein the B-Tree comprises a B+Tree.

10. A computer program product, comprising a non-transitory computer-readable medium having a computer-readable program code embodied therein, the computer-readable program code adapted to be executed by one or more processors to optimize file searches after file renaming in a data storage system having a file system comprising multiple functional layers of a computer processing architecture, by executing instructions implementing a computer-implemented method comprising:

defining, in a directory manager layer of the file system, a first location of a file through a file handle including a dirent and hash of the file in a first data structure: <parent_inode:child_inode>;

moving the file from a first location to a second location in a file rename operation to create a new file handle specifying a new parent inode and child inode for the dirent and hash of the file;

removing an inode record of the file handle from the first location from movement to the second location, wherein the inode record is a monotonically increasing number and further wherein an inode for the second location is higher than an inode for the first location;

creating, in the directory manager layer, a reference to the first location through a second data structure that reverses an order of the first data structure to: <child_inode:parent_inode> and serves as a forward link to the second location of the renamed file to maintain immutability of the file handle after the file renaming by pointing to an original inode reference for the file under an old parent directory of the first location;

deleting all dirent, hash, and inode data of the file from the first location;

using the second data structure to reference the file in the second location; and processing a lookup request for the renamed file by using the second data structure to locate data for the renamed file in the data storage system.

11. The computer program product of claim 10 wherein the file rename operations changes the parent_inode from a first inode value to a second inode value.

12. The computer program product of claim 10 wherein a parent_inode identifies a directory storing the file, and a child_inode identifies a file identifier of the file within the directory.

13. The computer program product of claim 10 wherein the dirent comprises a directory entry storing the name of a corresponding file, and the hash comprises a hash value of the name to facilitate fast name comparisons during a search operation.

14. The computer program product of claim 10 wherein a name space including the file are stored as a B-Tree in a file system.

15. The computer program product of claim 14 wherein the file system comprises a Data Domain deduplication storage system.

* * * * *